Jan. 1, 1929.
R. D. HUMPHREYS
1,697,504
METHOD AND APPARATUS FOR PRODUCING SHEET GLASS
Filed March 20, 1925
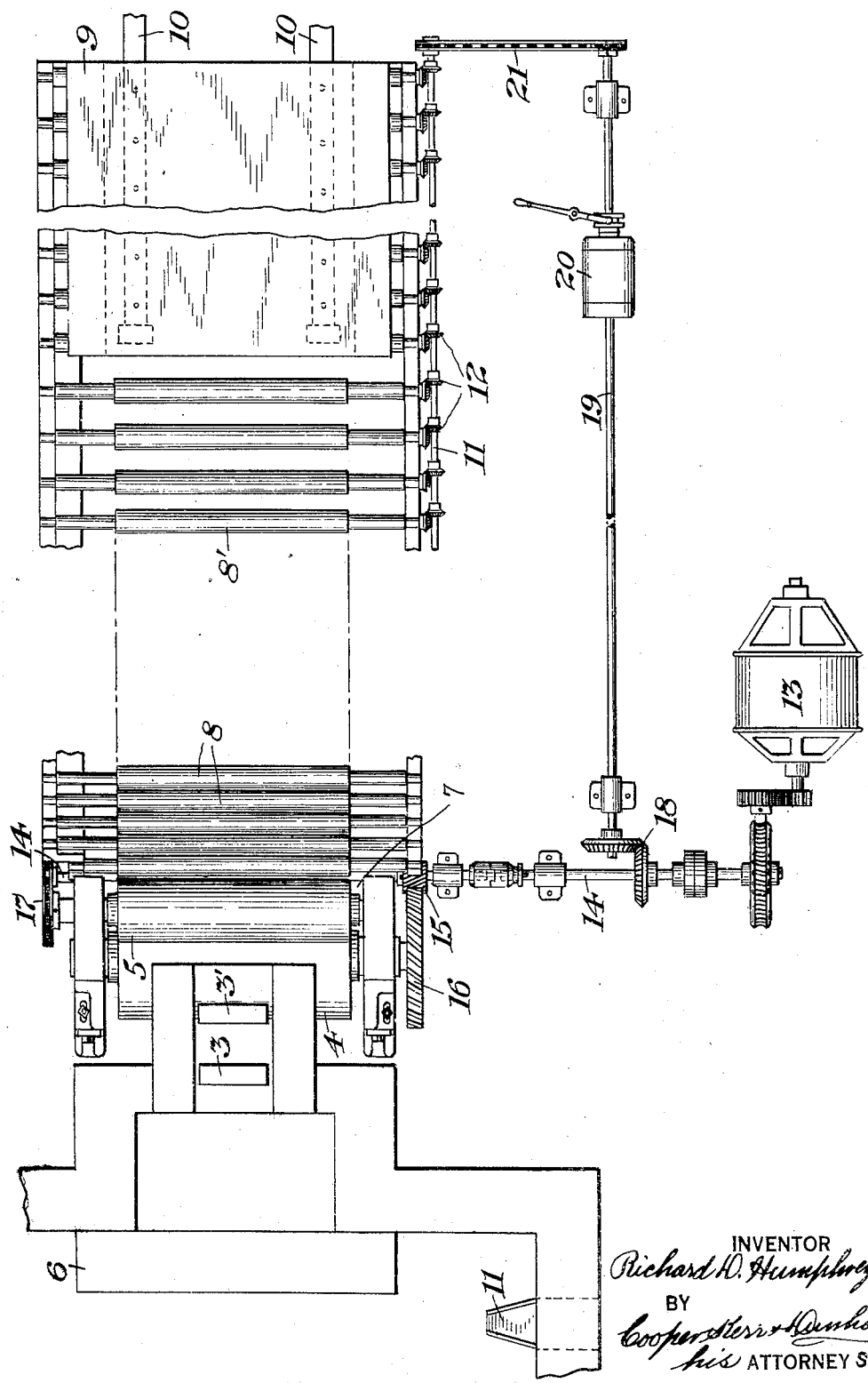
INVENTOR
Richard D. Humphreys
BY
Cooper Kerr & Dunham
his ATTORNEYS Patented Jan. 1, 1929.

1,697,504

UNITED STATES PATENT OFFICE.

RICHARD D. HUMPHREYS, OF MOUNT KISCO, NEW YORK, ASSIGNOR TO MISSISSIPPI GLASS COMPANY, A CORPORATION OF NEW YORK.

METHOD AND APPARATUS FOR PRODUCING SHEET GLASS.

Application filed March 20, 1925. Serial No. 16,884.

My present invention relates to methods of and apparatus for forming, conveying, and treating glass or similar material while it is in a molten state and while it is passing from such state to a hardened and cooler state. It relates further to an apparatus adapted for forming sheet glass in a continuous stream and by which the glass is carried through an annealing lehr at the same rate of speed as that at which it is formed, or for forming single sheets at a high rate of speed and passing them directly to a conveyor which carries them through an annealing lehr at a low rate of speed.

In the apparatus comprising my invention is provided in one embodiment thereof means as a furnace for producing molten glass, means for feeding it therefrom, forming rolls receiving said molten glass for forming it in a sheet at a speed when desired at which the surfaces of said sheet acquire a fire polish of high degree, conveying mechanism for receiving it from said forming rolls, and an annealing chamber for treating said sheet while it is traveling at a desired rate of speed therethrough on said conveyor. Said conveyor comprises a set of rolls extending from said forming means to and through the lehr, a number of said rolls immediately after the forming means are idler rolls and the others following them extending to and through the lehr are driven rolls which are made to travel at a desired rate of speed in accordance with annealing results required and also according as to whether a continuous sheet is being formed by the forming means or whether single sheets are being formed. In the case where a continuous sheet is being formed the driven rolls are given a speed substantially the same as that of the forming rolls. When separate sheets are formed however the driven conveyor rolls are given a proper rate of speed for carrying the glass through the lehr at a suitable annealing rate while the forming rolls are driven more rapidly and are driven to form the separate sheets of glass at a high rate of speed at which the surfaces of said sheets acquire a fire polish of high degree. It is to be understood however that when desired when the separate sheets are being formed that the forming rolls and the conveying rolls are driven at substantially the same rates of speed.

In the drawing is shown an embodiment of my invention which is a plan view showing in part a glass melting furnace, a glass feeding gate therefor, sheet glass forming rolls for receiving the molten glass from such gate, and conveyor rolls progressively spaced at a greater distance apart from the rolls to the lehr shown for receiving the glass sheets and through which said roll conveyor extends, driving means for the forming rolls, and driving means for a latter section of the conveyor rolls, the conveyor rolls between this latter section and the forming rolls belong idler rolls.

In the drawings the glass furnace 1 having molten glass 2 therein is provided with the alternating gates 3, 3' for allowing molten glass to pass thereby in desired quantities onto the forming rolls 4 and 5. Said gates 3, 3' also serve to skim off any slag which may have passed by the skimmer 6. The member 7 conforming in shape on its underside to that of roll 4 and on its upper side with the path of the sheet glass from the rolls to the conveyor rolls 8, 8' serves to guide the sheet glass from said forming rolls to said conveyor rolls. The conveyor comprising said rolls 8, 8' extends from said forming rolls 4 and 5 into the lehr 9 which is heated in a manner well known in the art by gas supplied from the mains 10, 10. A feed hopper 11 is provided for the glass furnace 1 for carrying a glass mix to the said furnace.

Throughout the length of the conveyor comprising them said conveyor rolls 8, 8' are progressively spaced apart at increasingly greater distances from said rolls 4, 5 to the end of said lehr 9. The conveyor rolls 8, 8 which are nearer the forming rolls are idler rolls while the rolls 8', 8' further along and extending to and through the lehr are driven through the shafts 11 and bevel gears 12 by means of a suitable source of power such as the electric motor 13 which connects to said shaft 11 and bevel gears 12, 12 through the bevel gears 18, 18, countershaft 19, variable speed clutch 20, and the sprocket chain 21. The forming roll 4 is also driven by said motor 13 and connects therewith through the shaft 14 and pinion and gear 15, 15, while said roll 5 is driven from said shaft 14 by the sprocket chain 17.

In the use and operation of the apparatus for forming continuous sheet, molten glass is admitted past the gates 3, 3' onto the moving rolls 4, 5 where it is formed into sheet of the desired thickness. From said forming rolls the glass sheet passes over the idler conveyor rolls 8, 8 and onto the driven conveyor rolls 8', 8' which carry it as it is formed to said lehr 9 where it is properly annealed in a manner well known in the art. The rolls 8, 8' being closer together at the forming end of the conveyor the glass in the soft state in adequately supported thereby.

In the use and operation of the apparatus for forming separate sheets molten glass is admitted past the gates 3, 3' onto the rolls 4, 5 which are driven at a comparatively high rate of speed whereby the glass sheet is when desired fire glazed as it passes therebetween and is formed thereby. From said forming rolls the glass sheets pass quickly over the idler conveyor rolls 8, 8 and onto the driven conveyor rolls 8', 8' which carry them to and through said lehr 9 at a rate of speed suitable for the proper annealing thereof in a manner well known in the art.

In the formation of separate sheets, then, the forming rolls are driven intermittently at a comparatively high rate of speed each sheet after being formed being given sufficient time to be carried away by said conveyor rolls 8', 8'. The section of idler rolls 8, 8 extends throughout a length which is a little greater than that of the sheets being formed so that the slow moving driven rolls 8', 8' will not cause the buckling of the sheet glass as it comes from the forming rolls. The impetus given the glass sheets serves to carry them over the idler rolls and into conveying engagement with the driven rolls 8', 8'.

It is to be understood that when the apparatus is used for forming continuous sheet at a high rate of speed, a lehr or lehrs of suitable length are provided for annealing the sheet glass for a suitable time to produce the desired results. When this is done the speed of the driven conveyor rolls 8', 8' is, by means of the variable speed clutch 20 operating in a well known manner, brought to the same linear velocity as the forming rolls 4, 5. When separate and short sheets of glass are formed the speed of the driven rolls 8', 8' is reduced through clutch 20 so that only such a length of the lehr is required for annealing them as is commensurate with the speed at which the separate sheets are formed, the time interval between the formation of consecutive sheets, between the high speed forming rolls, and the thickness of the glass sheet being formed. It will thus be seen that when the intermittent sheet forming method is being followed the lehr is run at its best efficiency, that the intermittent formation of sheets by the forming rolls is so timed that the edges of the sheets passing through the lehr are close together, that the full capacity of the apparatus and advantages of single sheet formation from a batch at efficient forming speeds are attained, all these factors operating to give a high grade product and permit the operators to make adjustments of the forming operations readily without the loss of time and duplication of apparatus.

I claim—

1. The combination in glass sheet producing apparatus comprising forming rolls, conveying and lehr rolls in operable relation to said forming rolls, means for intermittently driving the forming rolls at one speed, and means for driving certain of the conveying and lehr rolls at another speed characterized by that a set of idler rolls extend from the forming rolls to said driven conveying and lehr rolls for a distance at least equal to the length of the glass sheet being formed.

2. The combination in glass sheet producing apparatus comprising forming rolls, conveying and lehr rolls in operable relation with said forming rolls, means for intermittently driving the forming rolls at one speed, and regulable means for driving the conveying and lehr rolls at a desired speed with relation to that of said forming rolls and means between said forming rolls and the said conveying and lehr rolls comprising a set of idler conveying rolls for permitting a newly formed sheet to change speed without buckling as it passes to the driven conveying and lehr rolls.

3. The method of producing glass sheet comprising the steps of intermittently forming the sheet by rolling at a high rate of speed and conveying the sheet through annealing means at a rate commensurate with the thickness thereof.

4. The method of producing glass sheet comprising the steps of intermittently forming glass sheets by rolling intermittently at a high rate of speed and continuously conveying the formed sheets at a slower rate through annealing apparatus.

5. The combination in glass sheet producing apparatus comprising forming rolls, conveying and lehr rolls in operable relation to said forming rolls, means for intermittently driving the forming rolls at one speed to intermittently form sheets of glass, and means for driving the conveying and lehr rolls continuously at another speed, the time between such intermittent formations being made such that the glass sheets are fed to and passed through the annealing apparatus in a close spaced relation, and means for permitting such said time relation comprising a set of idler conveying rolls extending between the forming rolls and the driven conveying and lehr rolls.

6. In combination with sheet glass forming rolls, a conveyor comprising a set of idler rolls and a set of driven rolls, means for intermittently driving said forming rolls at one speed, and means for continuously driving said driven conveyor rolls at a given speed with relation to that of said forming rolls.

7. In combination with sheet glass forming rolls and an annealing lehr, a conveyor extending from said forming rolls to and through said lehr, said conveyor comprising a set of idler rolls next to the forming rolls extending over a distance at least equal to the length of the sheet and a set of driven rolls following them, means for intermittently driving said forming rolls at one speed, and means for driving said driven conveyor rolls at a given speed with relation to the speed of said forming rolls.

8. The method of producing glass sheet comprising the steps of intermittently forming glass sheets by rolling intermittently at a high rate of speed and continuously conveying the formed sheets at a slower rate through annealing apparatus, the time between such intermittent formations being made such that the glass sheets are fed to and passed through the annealing apparatus in a close spaced relation.

In testimony whereof I hereto affix my signature.

RICHARD D. HUMPHREYS.